United States Patent [19]

Finnerty et al.

[11] Patent Number: 5,408,152

[45] Date of Patent: Apr. 18, 1995

[54] METHOD OF IMPROVING HEAT TRANSFER IN STATOR COIL COOLING TUBES

[75] Inventors: Roger M. Finnerty, Orlando; Kathleen M. Biseli, Oviedo; James R. Pipkin, Casselberry; Lon W. Montgomery, Winter Springs, all of Fla.

[73] Assignee: Westinghouse Electric Corporation, Pittsburgh, Pa.

[21] Appl. No.: 219,050

[22] Filed: Mar. 28, 1994

[51] Int. Cl.⁶ ............................ H02K 9/00; H02K 1/20
[52] U.S. Cl. ............................................. 310/54; 310/53
[58] Field of Search ................... 310/52, 53, 54, 64, 310/65; 165/96, 133

[56] References Cited

U.S. PATENT DOCUMENTS

| | | | |
|---|---|---|---|
| 4,705,103 | 11/1987 | Zogg et al. | 165/133 |
| 4,799,543 | 1/1989 | Iversen et al. | 165/133 |
| 4,837,469 | 6/1989 | Ward | 310/53 |
| 4,921,042 | 5/1990 | Zohler | 165/133 |
| 5,066,882 | 11/1991 | Sargeant | 310/53 |

FOREIGN PATENT DOCUMENTS 1199389  8/1965  Germany ............................ 310/54

Primary Examiner—Steven L. Stephan
Assistant Examiner—Clayton E. LaBalle

[57] ABSTRACT

A method of cooling an electrodynamic machine having an inner-cooled stator winding consisting of a stator coil surrounding a cooling tube, including the steps of locating a hot-spot along a length of the stator coil through which the cooling tube runs, deforming the cooling tube at a tube location generally adjacent the hot-spot so as to increase the flow resistance of the cooling tube, and flowing a cooling medium through the cooling tube during operation of the electrodynamic machine to effect a heat transfer between the stator coil and the cooling medium.

13 Claims, 2 Drawing Sheets

METHOD OF IMPROVING HEAT TRANSFER IN STATOR COIL COOLING TUBES

BACKGROUND OF THE INVENTION

This invention relates generally to methods of cooling an induction-type electrodynamic system such as an electrical generator or motor and, more particularly, relates to a method for improving the heat transfer in stator coil cooling tubes.

In the art, stator coils of an inner-cooled electrodynamic power generator are typically constructed of columns or stacks of copper strands surrounding stacks of cooling tubes through which a coolant such as hydrogen gas or air is circulated. The circulated coolant is used as a means to regulate the temperature of the electrodynamic machine thereby allowing the machine to operate under increased load conditions. While current stator construction is effective in achieving the desired cooling effect, it has been seen that hot-spot temperatures sometime approach the maximum allowable temperature for the particular electrodynamic machine which in turn diminishes the power density of the machine. This hot-spot temperature is especially seen at the end of the stator coil in air cooled machines due to the build up of heat in the coolant gas, and at the end of the embedded length in the core due to higher cross-slot eddy current losses in the hydrogen cooled machines which is typical for their higher power rating. Therefore, a need exists for further minimizing hot-spot temperatures within the stator coils whereby higher power densities in gas cooled electrodynamic machines may be achieved.

As a result of this existing need, it is an object of the present invention to provide an inner cooled coil having improved heat transfer between the walls of the cooling tubes and the gas flowing therein for removing the effect of localized hot-spots.

SUMMARY OF THE INVENTION

In accordance with the present invention, a method of cooling an electrodynamic machine having an inner-cooled stator winding comprising a stator coil surrounding a cooling tube is provided. The method generally consists of the steps of locating a hot-spot along a length of the stator coil through which the cooling tube runs, deforming the cooling tube at a tube location generally adjacent the hot-spot so as to increase the flow resistance of the cooling tube, and flowing a cooling medium through the cooling tube during operation of the electrodynamic machine to effect a heat transfer between the stator coil and the cooling medium.

A better understanding of the objects, advantages, features, properties and relationships of the invention will be obtained from the following detailed description and accompanying drawings which set forth an illustrative embodiment and is indicative of the various ways in which the principles of the invention may be employed.

BRIEF DESCRIPTION OF THE DRAWINGS

For a better understanding of the invention, reference may be had to the preferred embodiment shown in the following drawings in which.

DETAILED DESCRIPTION

While the invention can be used as a method of improving heat transfer in electrodynamic machines, it will be described hereinafter in the context of a method of improving heat transfer in inner-cooled stator coils of electric generators as the preferred embodiment thereof.

Figure 1:
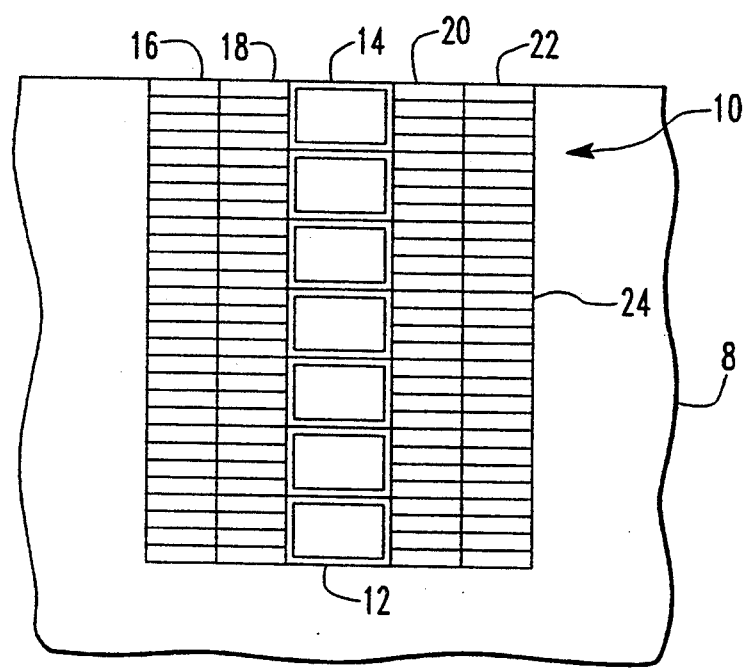
FIG. 1 shows a cross sectional view of a stator and inner-cooled half coil assembly.

Referring now to the FIG. 1, the stator 8 of a gas inner-cooled generator is shown having a half-coil 10 of such a gas inner-cooled stator winding. As is representative of stator windings, the half-coil 10 includes a stack 12 of typically nickel-silver or stainless steel cooling tubes 14 for circulating a coolant, with a pair of copper strand stacks 16, 18 and 20, 22, respectively, positioned on each side of the stack 12. Each of the strand stacks 16, 18, 20, 22 contain a plurality of individual strands 24, which are electrically insulated from each other and have a substantially rectangular crosssection which facilitates in the stacking. In such a half-coil 10, it is usual to transpose strand stack 16 with strand stack 18 and to transpose strand stack 20 with strand stack 22 to cancel out, as far as possible, the unbalanced voltages which might otherwise be generated between strands in the respective stacks. It is to be noted that the described single stack of cooling tubes configuration is illustrative only and that certain electrodynamic machinery require more than one stack of cooling tubes for conducting heat away from the half-coil of the stator winding.

Figure 2:
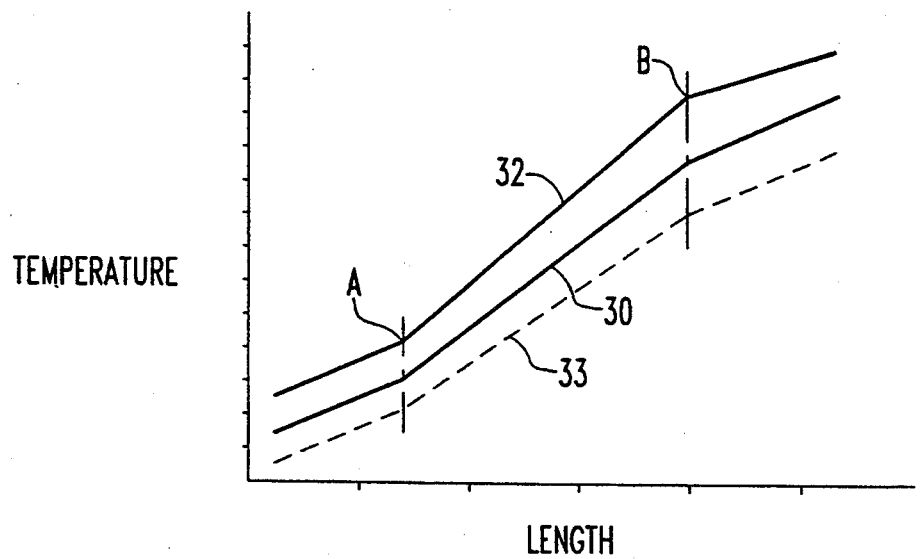
FIG. 2 shows a graphical representation of temperature vs. length as measured axially in a stator coil of an air cooled machine.

Referring to FIG. 2, shown is the temperature distribution along a typical air-cooled stator coil, having embedded length between points A and B, from the point at which the cold gas enters the stator coil cooling tube at one end of the electrodynamic machine to the point at which the warmed gas exits the stator coil cooling tube at the opposite end of the electrodynamic machine. By way of example, FIG. 2 shows the temperature over axial length for the cooling tube, shown as line 30, the copper strand stacks, shown as line 32, and the cooling gas, shown as line 33. In the air cooled generator depicted in the graph, the hottest spot can be seen to be at the end of the coil and would be the localized hot-spot to which the invention would typically be applied. In the present example, a computer simulated design was utilized to anticipate the location of hot-spots within the generator although other methods of determining the location of hot-spots such as thermal imaging of operating dynamoelectric machines is contemplated.

Figure 3:
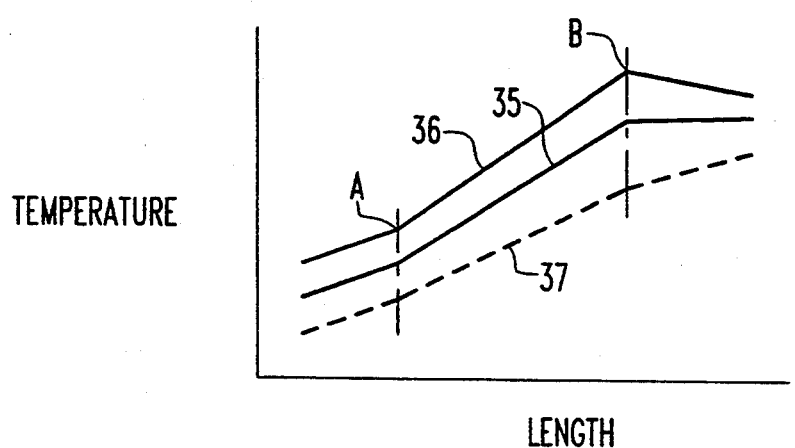
FIG. 3 shows a graphical representation of temperature vs. length as measured axially in a stator coil of a hydrogen cooled machine.

FIG. 3 further depicts, by way of example, the temperature distribution along a typical hydrogen-cooled stator coil, having an embedded length between points A and B, from the point at which the cold gas enters the stator coil cooling tube at one end of the electrodynamic machine to the point at which the warmed gas exits the stator coil cooling tube at the opposite end of the electrodynamic machine, similar to FIG. 2. In the figure, line 35 shows the temperature over the axial length for the cooling tube, line 36 shows the temperature of the copper strand stacks, and line 37 shows the temperature of the cooling gas. In the hydrogen cooled generator depicted, it can be seen that the hottest spot appears at the end of the embedded length in the core.

In accordance with the present invention, to locally lower the temperature at the location of the hot-spots within the stator, the heat transfer between the walls of the cooling tubes and the gas flowing inside the tubes is improved. This improved heat transfer is accomplished by deforming the surface of the cooling tube at the location where hot-spots are detected. Increasing the aerodynamic friction factor over a shortlength of the tube walls around the hot spot increases the convective heat transfer coefficient locally which in turn causes the temperature difference between the tube and the cooling gas to be lower. This is shown in FIG. 2 by line B. Correspondingly, the coil temperature will be decreased by a percentage as calculated by the Petrokhov equation, which is used to calculate both the Nusselt's number and the convection heat transfer coefficient "h", which heat transfer expressions are known to those skilled in the art.

Specifically, to improve the heat transfer between the stator and the cooling gas, the surface of the walls of the cooling tube nearest the vicinity of the hot spot are deformed to increase the flow resistance applied to the cooling medium at the specified locale thereby improving the localized heat transfer. This deformation may be accomplished by scratching the interior walls of the cooling tube with a wire brush or the like, by pitting the interior walls of the cooling tube with high-voltage electric discharges, or by slightly crimping the tubes thereby creating irregularities in the cooling tube flow surface. It is desirous to roughen the cooling tube, normally 15 to 20 thousandths of an inch thick, generally on the order of 20–30 millionths of an inch over approximately 10 percent of the total length of the cooling tube in the area of localized hot-spots. Since the deformed section is only a small percentage of the total length of the cooling tube, the increase in flow resistance over the localized hotspots is only a small fraction of the combined flow resistances over the main length of the cooling tube with intake and exhaust pressure losses being considered. Therefore, locally deforming the walls results in an overall negligible change in flow of the cooling gas with the result that coil temperature is none-the-less capable of being reduced on the order of several degrees.

It should be apparent from the preceding description that this invention has among other advantages, the advantage of improving the overall efficiency of an electrodynamic system which translates into improved electrical ratings or in the alternative smaller size with maintained performance. Alternatively, the improved heat transfer technique would allow for the use of less expensive materials in the construction of the cooling tubes, such as a silicon-bronze alloy, which have a lower thermal conductivity than the materials typically used, thereby creating a cost savings during manufacture.

It is to be understood that the descriptions and drawings shown with respect to the present invention are not limiting and that other methods of deforming a cooling vent within an electrical stator to improve heat transfer between a cooling medium and the heat generating electrodynamic system utilizing the concepts of the present disclosure are contemplated.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

We claim:

1. A method of cooling an electrodynamic machine having an inner-cooled stator winding comprising a stator coil surrounding a cooling tube, the method comprising:
    locating a hot-spot along a length of the stator coil through which the cooling tube runs;
    deforming the cooling tube at a tube location generally adjacent the hot-spot so as to increase the flow resistance of the cooling tube; and
    flowing a cooling medium through the cooling tube during operation of the electrodynamic machine to effect a heat transfer between the stator coil and the cooling medium.

2. The method as recited in claim 1, wherein deforming the cooling tube comprises scratching an interior section of the cooling tube with a wire brush.

3. The method as recited in claim 1, wherein deforming the cooling tube comprises pitting an interior section of the cooling tube with high-voltage electric discharges.

4. The method as recited in claim 1, wherein deforming the cooling tube comprises crimping the cooling tube.

5. The method as recited in claim 2, wherein scratching of the interior surface of the cooling tube is done to a depth of approximately 20 to 30 millionths of an inch.

6. The method as recited in claim 3, wherein pitting of the interior surface of the cooling tube is done to a depth of approximately 20 to 30 millionths of an inch.

7. The method as recited in claim 5, wherein deforming the cooling tube is performed over approximately 10 percent of the total cooling tube length.

8. The method as recited in claim 2, wherein the cooling tube comprises a silicon-bronze composite.

9. The method as recited in claim 3, wherein the cooling tube comprises a silicon bronze composite.

10. The method as recited in claim 4, wherein the cooling tube comprises a silicon bronze composite.

11. A method of cooling an electric generator having an inner-cooled stator winding comprising a stator coil surrounding a cooling tube, the method comprising:
    locating a hot-spot along a length of the stator coil through which the cooling tube runs;
    scratching an interior section of the cooling tube with a wire brush at a tube location generally adjacent the hot-spot so as to increase the flow resistance of the cooling tube; and
    flowing a cooling gas through the cooling tube during operation of the electric generator to effect a heat transfer between the stator coil and the cooling gas.

12. A method of cooling an electric generator having an inner-cooled stator winding comprising a stator coil surrounding a cooling tube, the method comprising:
    locating a hot-spot along a length of the stator coil through which the cooling tube runs;
    crimping the cooling tube at a tube location generally adjacent the hot-spot so as to increase the flow resistance of the cooling tube; and
    flowing a cooling gas through the cooling tube during operation of the electric generator to effect a heat transfer between the stator coil and the cooling gas.

13. A method of cooling an electric generator having an inner-cooled stator winding comprising a stator coil surrounding a cooling tube, the method comprising:
locating a hot-spot along a length of the stator coil through which the cooling tube runs;
pitting an interior section of the cooling tube with high-voltage electric discharges at a tube location generally adjacent the hot-spot so as to increase the flow resistance of the cooling tube; and
flowing a cooling gas through the cooling tube during operation of the electric generator to effect a heat transfer between the stator coil and the cooling gas.

* * * * *